(12) United States Patent
Kozaki et al.

(10) Patent No.: US 7,352,553 B2
(45) Date of Patent: Apr. 1, 2008

(54) MAGNETIC BEARING CONTROL DEVICE

(75) Inventors: Junichiro Kozaki, Hadano (JP); Masaki Ofuji, Hadano (JP)

(73) Assignee: Shimadzu Corporation, Kyoto (JP)

( * ) Notice: Subject to any disclaimer, the term of this patent is extended or adjusted under 35 U.S.C. 154(b) by 373 days.

(21) Appl. No.: 11/130,239

(22) Filed: May 17, 2005

(65) Prior Publication Data

US 2006/0017340 A1 Jan. 26, 2006

(30) Foreign Application Priority Data

May 17, 2004 (JP) ............... 2004-146775

(51) Int. Cl.
*H02K 7/09* (2006.01)
(52) U.S. Cl. ..................... 361/139; 310/90.5
(58) Field of Classification Search ................ 361/139, 361/143, 144; 310/90.5
See application file for complete search history.

(56) References Cited

U.S. PATENT DOCUMENTS 5,760,511 A * 6/1998 Nakagawa et al. ........ 310/90.5
5,924,186 A * 7/1999 Nakagawa et al. ........ 29/602.1
5,973,468 A * 10/1999 Yamauchi ................... 318/610

\* cited by examiner

*Primary Examiner*—Michael Sherry
*Assistant Examiner*—Danny Nguyen
(74) *Attorney, Agent, or Firm*—Manabu Kanesaka

(57) ABSTRACT

A magnetic bearing control device includes a rotation speed sensor for detecting a rotational speed of a rotating member supported on an axial magnetic bearing and a radial magnetic bearing without contact, and a displacement sensor for detecting an axial displacement of the rotating member. A control unit outputs a control signal of the axial magnetic bearing based on a signal from the displacement sensor. A filter unit reduces a signal with a specific frequency from the control signal output from the control unit, and passes a remaining signal, and a driving unit drives the axial magnetic bearing based on the signal output from the filter unit. The filter unit includes several notch filters with different ranges of the specific frequencies, and a selection device for selecting at least one of the notch filters according to the rotational speed.

6 Claims, 10 Drawing Sheets

(G: gain adjusted value)

MAGNETIC BEARING CONTROL DEVICE

BACKGROUND OF THE INVENTION AND RELATED ART STATEMENT

The invention relates to a magnetic bearing control device of a magnetic bearing used for a turbo-molecular pump and the like.

In a turbo-molecular pump or a compressor, a magnetic bearing device having an electromagnet is provided as a bearing for supporting a rotating member. In such a magnetic bearing device, generally, three or more axes including a radial axis and an axial axis are controlled, and the electromagnet is controlled with PID feedback based on a signal of a displacement sensor, so that the rotating member is magnetically levitated without contact.

In a rotating device such as a turbo-molecular pump or compressor, resonance is generated due to a characteristic vibration of the rotating member. Conventionally, in each of the axial axis and radial axis, a notch filter with a specific frequency is generally provided for dealing with the resonance. Further, a characteristic frequency of the rotating member depends on a rotational speed. Accordingly, there is a method to adjust a center frequency of a notch filter according to a change in the characteristic frequency (for example, refer to the Patent Document 1).

Patent Document 1: Japanese Patent Publication (Kokai) No. 05-231428

The turbo-molecular pump has a different characteristic frequency of the axial axis caused by a vibration of a rotor blade in each pump. When the device has a different characteristic frequency, it is necessary to provide the notch filter with a wide range of frequencies according to the characteristic frequency. When the notch filter has a wide range of frequencies, the notch filter tends to have a low reduction gain. As a result, a design margin with respect to the resonance decreases, so that the rotor blade may be easy to oscillate. Moreover, when the rotor has many kinds of blades, the characteristic frequencies tend to have a wide range, thereby making it difficult to use the notch filter in constant number design.

When the center frequency of the notch filter is adjusted according to a rotational speed, it is necessary to adjust the center frequency so that a rotational frequency is in a range of a phase-lead characteristic of the notch filter, i.e., a range slightly higher than the center frequency. Therefore, it is necessary to accurately determine a difference among devices. In an actual case, it is possible that the rotor blades resonate due to the difference in the characteristic frequencies among the devices. When the rotor blades resonate, the rotor blades may contact stator blades, thereby producing dust due to the contact.

In view of the problems described above, an object of the present invention is to provide a magnetic bearing control device for properly controlling a magnetic bearing, thereby preventing resonance.

Further objects and advantages of the invention will be apparent from the following description of the invention.

SUMMARY OF THE INVENTION

In order to attain the objects described above, according to a first aspect of the present invention, a magnetic bearing control device includes a rotational speed sensor for detecting a rotational speed of a rotating member supported on an axial magnetic bearing and a radial magnetic bearing without contact; a displacement sensor for detecting an axial displacement of the rotating member; a control unit for outputting a control signal of the axial magnetic bearing based on a signal from the displacement sensor; a filter unit for reducing a signal with a specific frequency band from the control signal output from the control unit, and passing a remaining signal; and a driving unit for driving the axial magnetic bearing based on the signal from the filter unit. The filter unit includes a plurality of notch filters with the specific frequency bands; and a selection device for selecting one notch filer from the plurality of notch filters according to the rotational speed detected by the rotational speed sensor, and inputting the control signal to the one notch filter.

According to a second aspect of the present invention, a magnetic bearing control device includes a rotational speed sensor for detecting a rotational speed of a rotating member supported on an axial magnetic bearing and a radial magnetic bearing without contact; a displacement sensor for detecting an axial displacement of the rotating member; a control unit for outputting a control signal of the axial magnetic bearing based on a signal from the displacement sensor; a filter unit for reducing a signal with a specific frequency band from the control signal output from the control unit, and passing a remaining signal; and a driving unit for driving the axial magnetic bearing based on the signal output from the filter unit. The filter unit includes a plurality of notch filters with the specific frequency bands; and a forming device for selecting more than two notch filters from the plurality of notch filters according to the rotational speed detected by the rotational speed sensor, and connecting the more than two notch filters in series to form a group of notch filters, so that the control signal is input to the group of notch filters.

According to a third aspect of the present invention, in the magnetic bearing control device in the second aspect, the forming device selects the more than two notch filters such that the group of notch filters includes at least one same notch filter before and after the forming device selects the more than two notch filters from the plurality of notch filters according to the rotational speed detected by the rotational speed sensor.

According to a fourth aspect of the present invention, in the magnetic bearing control device in one of the second and third aspects, the plurality of notch filters selected by the forming device has different center frequencies of specific frequency bands, and includes two notch filters with the adjacent center frequencies having the specific frequency bands partially overlapped.

In the present invention, even if there is a difference of the characteristic frequency in an axial direction among devices, it is possible to securely reduce resonance caused by the characteristic frequency of the axial axis.

DETAINED DESCRIPTION OF PREFERRED EMBODIMENTS

Figure 1:
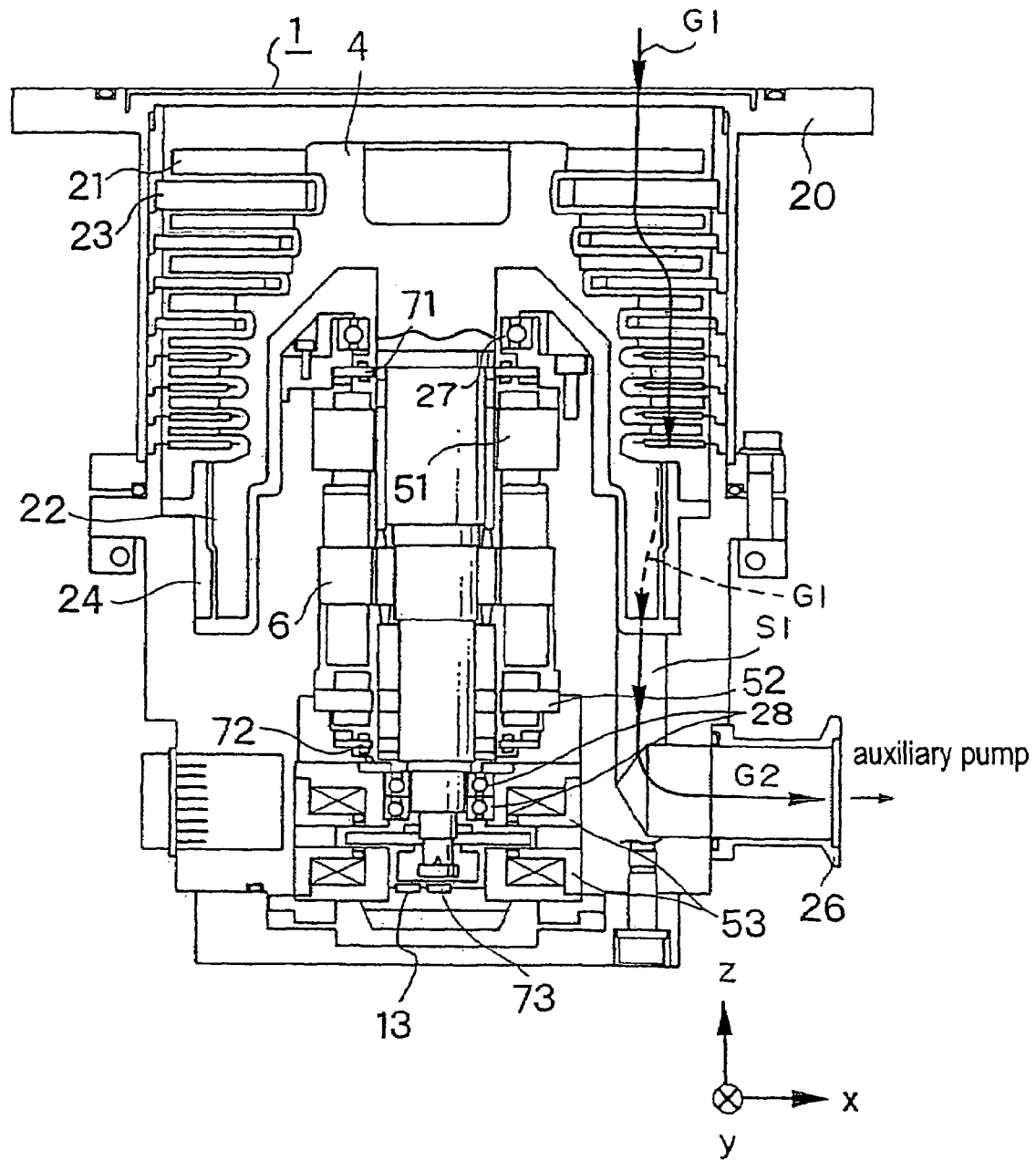
FIG. 1 is a cross sectional view of a magnetic bearing-type turbo-molecular pump with a magnetic bearing control device according to the present invention.

Hereunder, embodiments of the present invention will be explained with reference to the accompanied drawings. FIG. 1 is a cross sectional view of a magnetic bearing-type turbo-molecular pump with a magnetic bearing control device according to the present invention.

In a casing 20 of a pump main body 1, there are provided a rotor 4 having a plurality of rotor blades 21 with different levels and a thread groove portion 22; stator blades 23 alternately provided with respect to the rotor blades 21; and a cylindrical member 24 facing the thread groove portion 22. The rotor blades 21 and the stator blades 23 are constituted by a turbine blade. Electromagnets for supporting the rotor 4 without contact include electromagnets 51 and 52 constituting a radial magnetic bearing; and electromagnets 53 constituting an axial magnetic bearing. As described later, the electromagnets constitute a five-axes control-type magnetic bearing. A rotational speed of the rotor 4 is detected by a rotational speed sensor 13.

Radial displacement sensors 71 and 72 and an axial displacement sensor 73 are provided relative to the radial electromagnets 51 and 52 and the axial electromagnets 53. When the rotor 4 is driven by a motor 6 while being supported on the electromagnets 51, 52, and 53 without contact, gas on an inlet side is exhausted to a back pressure side (space S1) as shown by an arrow G1, and gas exhausted to the back pressure side is exhausted by a donkey pump (not shown) connected to an outlet flange 26 as shown by an arrow G2. Reference numerals 27 and 28 denote emergency mechanical bearings.

Figure 2:
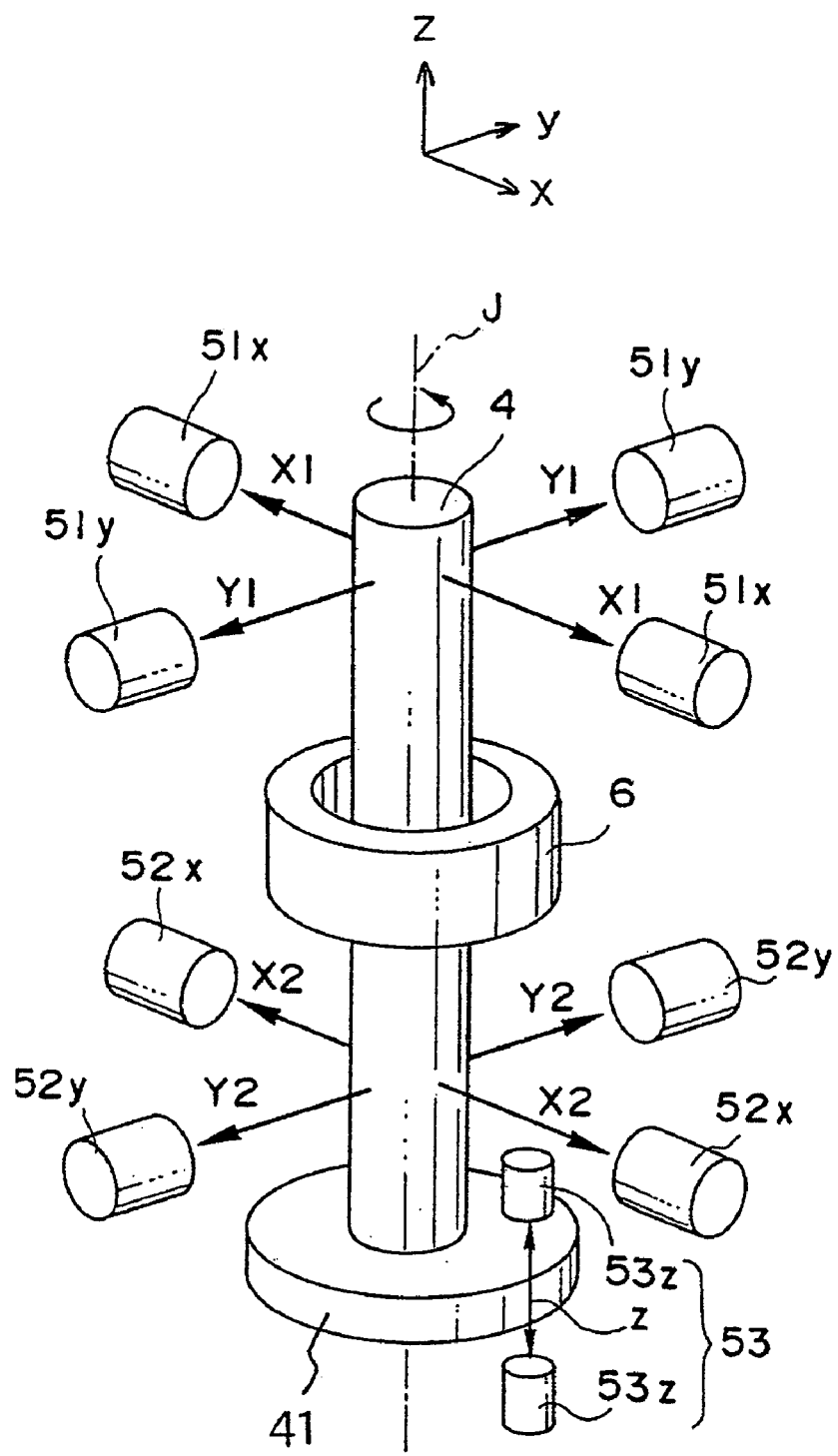
FIG. 2 is a schematic diagram showing a magnetic bearing of a five-axes control type.

FIG. 2 is a schematic diagram showing a magnetic bearing of a five-axes control type, wherein a rotational axis J of the rotor 4 corresponds to a z axis. The radial electromagnets 51 shown in FIG. 1 include: a pair of electromagnets 51x with respect to an x axis; and a pair of electromagnets 51y with respect to a y axis. Similarly, the radial electromagnets 52 include: a pair of electromagnets 52x with respect to the x axis; and a pair of electromagnets 52y with respect to the y axis. Also, the axial electromagnets 53 include a pair of electromagnets 53z. A pair of electromagnets 53z faces each other to sandwich a disk 41 provided at a lower end of the rotor 4 along the z axis.

The displacement sensors 71 and 72 in FIG. 1 also correspond to the electromagnets 51x, 51y, 52x, and 52y, and are formed of a pair of radial displacement sensors, respectively. The five pairs of electromagnets 51x, 51y, 52x, 52y, and 53, and the displacement sensors 71 to 73 constitute the five-axes control-type magnetic bearing. Displacement sensors 7 (71 and 73) are inductance-style sensors, and gap displacement is converted to an electronic signal by using a change in an impedance of the sensor portion due to a change in the gap displacement. A surface of the rotor 4 opposite to the sensors is formed of a ferromagnetic material or conductive material.

Figure 3:
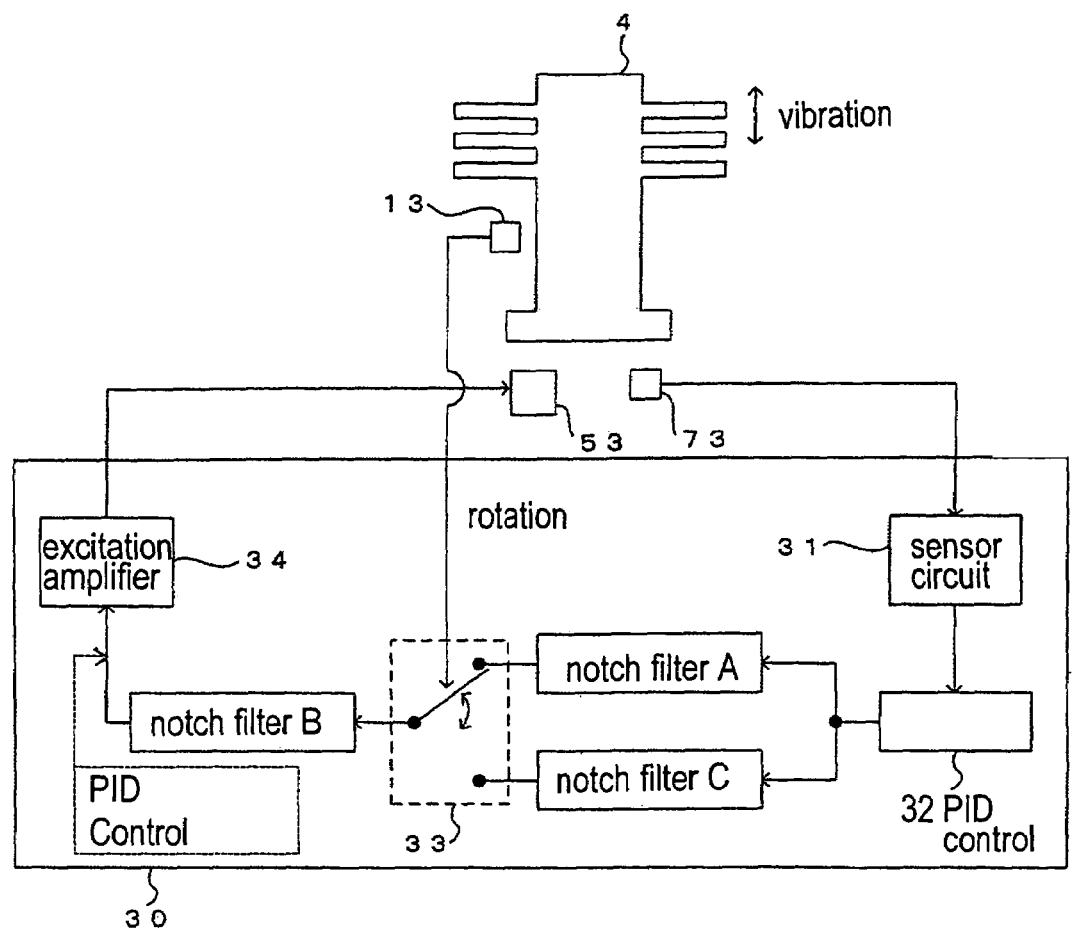
FIG. 3 is a block diagram showing a configuration of a magnetic bearing control system in an axial direction.

FIG. 3 is a block diagram showing a configuration of a magnetic bearing control system in an axial direction. The axial electromagnets 53 are controlled by a magnetic bearing control device 30. A sensor signal from the displacement sensor 73 is input to a sensor circuit portion 31 of the magnetic bearing control device 30, and then input to a PID control unit 32 after amplified at the sensor circuit portion 31.

In the PID control unit 32, a difference between a reference signal indicating a floating target position of the rotor 4 and the input sensor signal is calculated. The PID control 32 calculates a current control amount through PID calculation based on the difference signal, and controls an exciting current of the axial electromagnets 53 through feedback control.

Three notch filters A, B, and C are provided in a second stage of the PID control unit 32 for preventing a resonance in the axial direction. An electromagnetic current signal output from the PID control unit 32 is input to the notch filters A and C. The notch filters A and C are connected in parallel, and the notch filters A and C are connected to the notch filter B in series.

Figure 4A:
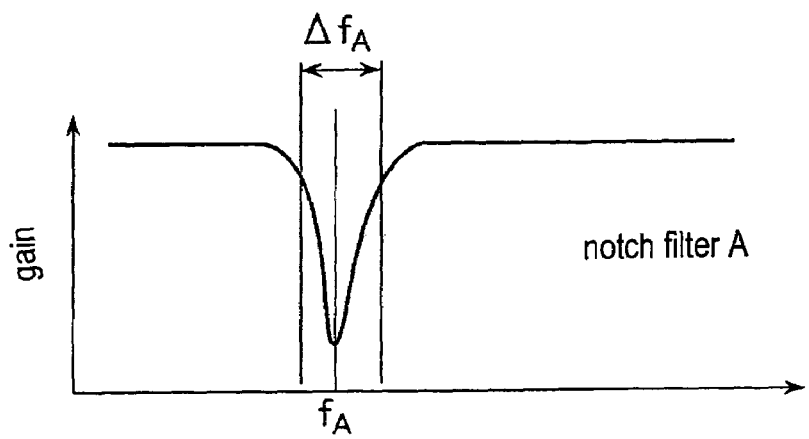
FIGS. 4(a) to 4(c) are charts showing characteristics of notch filters A to C.
Figure 4B:
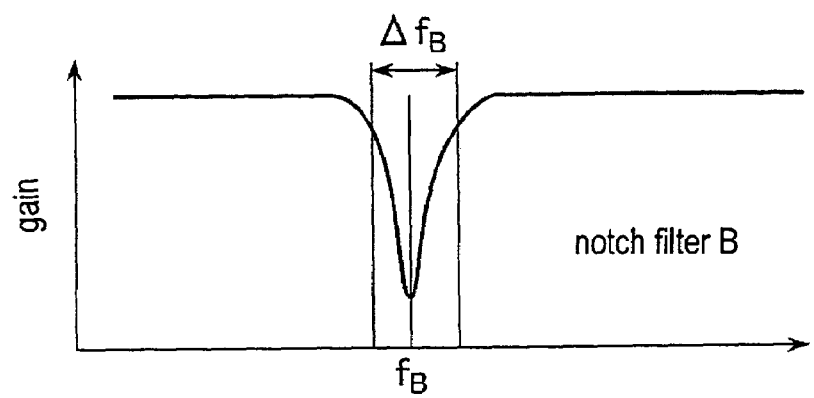
Figure 4C:
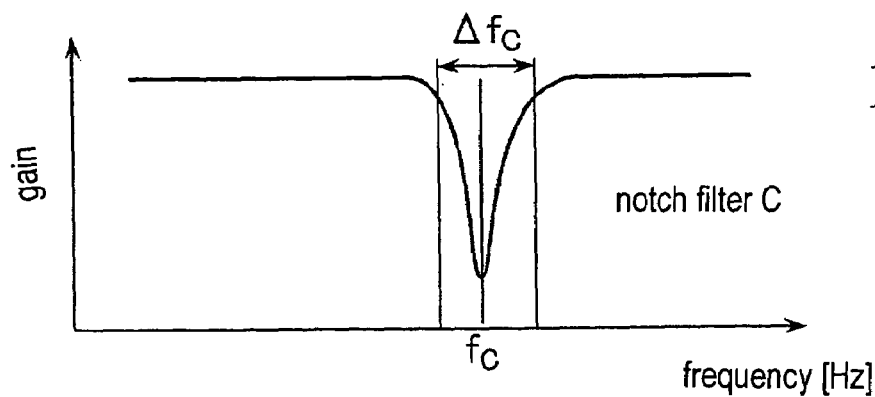

Center frequencies $f_A$, $f_B$, and $f_C$ of the notch filters A, B, and C are set such that $f_A < f_B < f_C$ is established as shown in FIGS. 4(a) to 4(c). Each of the notch filters A, B, and C cuts predetermined frequency ranges (non-passing bands) $\Delta f_A$, $\Delta f_B$, and $\Delta f_C$ centering on the frequencies $f_A$, $f_B$, and $f_C$. For example, when an electromagnetic current control signal output from the PID control unit 32 passes through the notch filter A, a signal in the frequency range $\Delta f_A$ is cut from the electromagnetic current control signal.

A filter switching portion 33 is provided between the notch filters A and C, and the notch filter B. The filter switching portion 33 is switched according to a rotational speed signal from a rotational speed sensor 13, so that one of the notch filters A and C connected in parallel becomes a used condition.

In the embodiment shown in FIG. 3, a changeover switch is connected to the notch filter A. In this case, a filter formed of the notch filters A and B connected in series is used. Contrary, when the filter switching portion 33 is switched to the notch filter C, a filter formed of the notch filters C and B connected in series is used. The electromagnetic current signal passing through the notch filter B is input to an exciting amp 34. An exciting current based on the electromagnetic current signal is applied to the axial electromagnets 53 from the exciting amp 34. Incidentally, the PID control 32 may be disposed after the notch filters and before the excitation amplifier 34.

Figure 5:
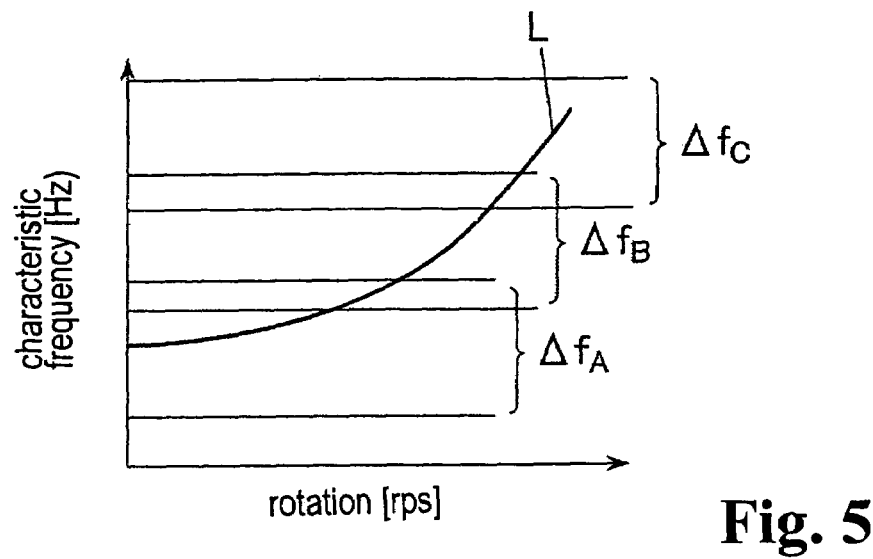
FIG. 5 is a chart showing a change in a characteristic frequency of an axial axis.

The characteristic frequency of the axial axis includes a characteristic frequency of the turbine blade provided on the rotor 4 in addition to a characteristic frequency of the magnetic bearing. The characteristic frequency of the axial axis does not generate separation of the characteristic frequency, i.e., separation between a frontward turn and backward turn due to a gyro effect, unlike in the case of the radial axis. The characteristic frequency of the axial axis includes a characteristic feature wherein the characteristic frequency increases according to the rotational speed as shown by a curve L in FIG. 5. Especially, the turbine blade has a cantilever structure, and a change in the characteristic vibration becomes large. In FIG. 5, $\Delta f_A$ shows the non-passing band wherein a gain decreasing effect of the notch filter A is effective. $\Delta f_B$ shows the non-passing band of the notch filter B, and $\Delta f_C$ shows the non-passing band of the notch filter C, respectively.

Figure 6:
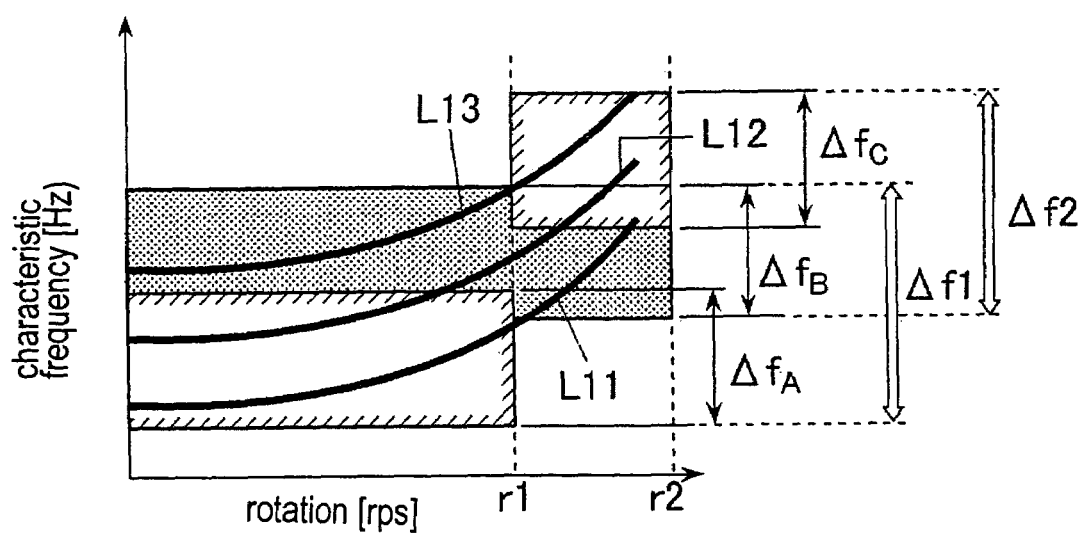
FIG. 6 is a chart showing a switching operation of notch filters.

As stated above, the characteristic frequency differs with respect to each device. For example, several turbo-molecular pumps show curves L11 to L13 in FIG. 6. FIG. 6 shows the characteristic frequencies of difference devices. The curves L11 and L13 show two extremes of the characteristic frequencies. The curve L12 shows an average characteristic frequency. The magnetic bearing control device 30 needs to control the magnetic bearings 53 of the devices having the characteristic frequencies as shown in FIG. 6.

In the embodiment, the three notch filters A, B, and C as shown in FIGS. 3 and 4 are prepared in advance, and the filter switching portion 33 is switched over according to the rotational speed of the rotor. A first filter called "notch filter A +notch filter B" and a second filter called "notch filter C+notch filter B" are used depending on a situation.

Figure 7A:
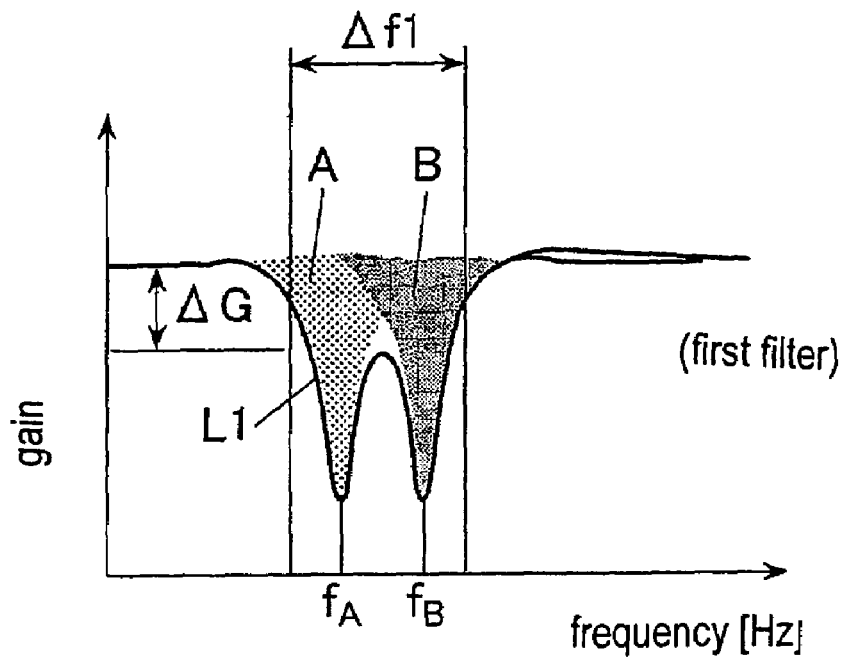
FIG. 7(a) is a chart showing a characteristic of a first filter.

FIG. 7(a) is a diagram showing a gain characteristic of the first filter. The gain characteristic of the first filter shown by a solid line L1 is a combination of the gain characteristic of the notch filter A and the gain characteristic of the notch filter B. The gain characteristic L1 includes a saddle portion around an intermediate frequency between the center frequency $f_A$ of the notch filter A and the center frequency $f_B$ of the notch filters B. The notch filters A and B are designed in such a way that a gain decrease amount $\Delta G$ in the saddle portion becomes larger than a design margin.

More specifically, when the non-passing band $\Delta f1$ has the gain decreasing effect of the first filter, the non-passing band $\Delta f1$ is a combination of the non-passing bands $\Delta f_A$ and $\Delta f_B$ of the notch filters A and B shown in FIG. 5. By adjusting a degree of an overlap between the non-passing bands $\Delta f_A$ and $\Delta f_C$, $\Delta G$ becomes larger than the design margin.

Figure 7B:
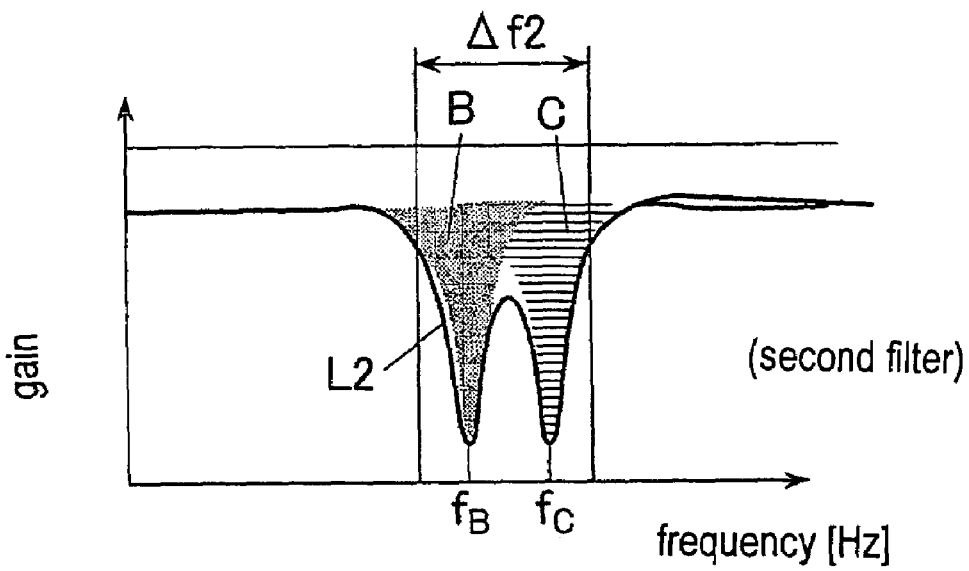
FIG. 7(b) is a chart showing the characteristic of a second filter.

FIG. 7(b) is a diagram showing a gain characteristic of the second filter. The gain characteristic of the second filter shown by a solid line L2 is a combination of the gain characteristic of the notch filter B and the gain characteristic of the notch filter C. The non-passing band $\Delta f2$ has the gain decreasing effect of the second filter, and is a combination of the non-passing bands $\Delta f_B$ and $\Delta f_C$ of the notch filters B and C as shown in FIG. 5.

Switching Operation Between Notch Filters A and C

A switching operation between the notch filters A and C by the switching portion 33 will be explained next with reference to FIGS. 3 and 6. In FIG. 6, the turbo-molecular pump including a characteristic L11 represents a pump 1A, and the turbo-molecular pumps including characteristics L12 and L13 represent pumps 1B and 1C, respectively. That is, when the rotational speed of the rotor of each pump 1A to 1C is increased from an idle state, the characteristic frequency changes along the characteristics L11 to L13, respectively.

As shown in FIG. 3, from the rotational speed r=0 to the rotational speed r=r1, the switching portion 33 is switched to the notch filter A, and the axis bearing control is carried out using the first filter wherein the notch filters A and B are connected in series. As shown in FIG. 6, to the rotational speed r1, all the characteristic frequencies of the pumps 1A to 1B are included in the non-passing band $\Delta f1$ of the first filter.

When the rotational speed r further increases and becomes r>r1, the characteristic frequency of the pump 1C (characteristic L13) runs off the non-passing band $\Delta f1$ and moves upwardly in the drawing. Accordingly, when the rotational speed r becomes r=r1, the filter switching portion 33 is switched to the notch filter C, and the axis bearing control is carried out using the second filter wherein the notch filters C and B are connected in series. In a range r1<r≦r2, the characteristic frequency of each pump 1A to 1C (characteristics L11 to L13) is included in the non-passing band $\Delta f2$ of the second filter. In addition, the rotational speed r2 represents the rotational speed in a steady state.

When the rotational speed r of the rotor decreases from the steady state (r=r2) in order to change the pump to the idle state, the control is carried out by the second filter until the rotational speed r becomes r=r1. When the rotational speed r becomes r=r1, the control is carried out by the first filter after the filter switching portion 33 is switched from the notch filter C to the notch filter A.

As described above, in the embodiment, the first and second filters are formed of the two notch filters with the non-passing bands partially overlapped. Accordingly, the non-passing bands $\Delta f1$ and $\Delta f2$ can be widened more than the individual notch filter. Therefore, as shown in FIG. 6, even if the characteristic frequency differs among the devices, the different characteristic frequencies can be included in the non-passing bands $\Delta f1$ and $\Delta f2$ of the first and second filters, thereby preventing resonance of the rotor blades.

Even when the characteristic frequency is changed according to the rotational speed, the filter switching portion 33 switches the first filter and the second filter at the rotational speed r1, thereby preventing resonance of the axial axis in a range from the stopping state (r=0) to the rated rotating state (r=r2). In this case, the switching is only carried out at r=r1. Accordingly, it is not necessary to accurately change the center frequency according to a range of the difference in the devices as in the case of a conventional device in which the center frequency is moved according to the rotational speed.

The notch filters A to C and the filter switching portion 33 shown in FIG. 3 may be formed of an analog circuit, or digital processing may be used. When the digital processing is carried out with DSP and the like, the notch filters A to C are formed of software. When the first filter is applied, the processing of the notch filters A and B is carried out. When the first filter is switched to the second filter, the processing of the notch filters C and B is carried out.

Figure 8:
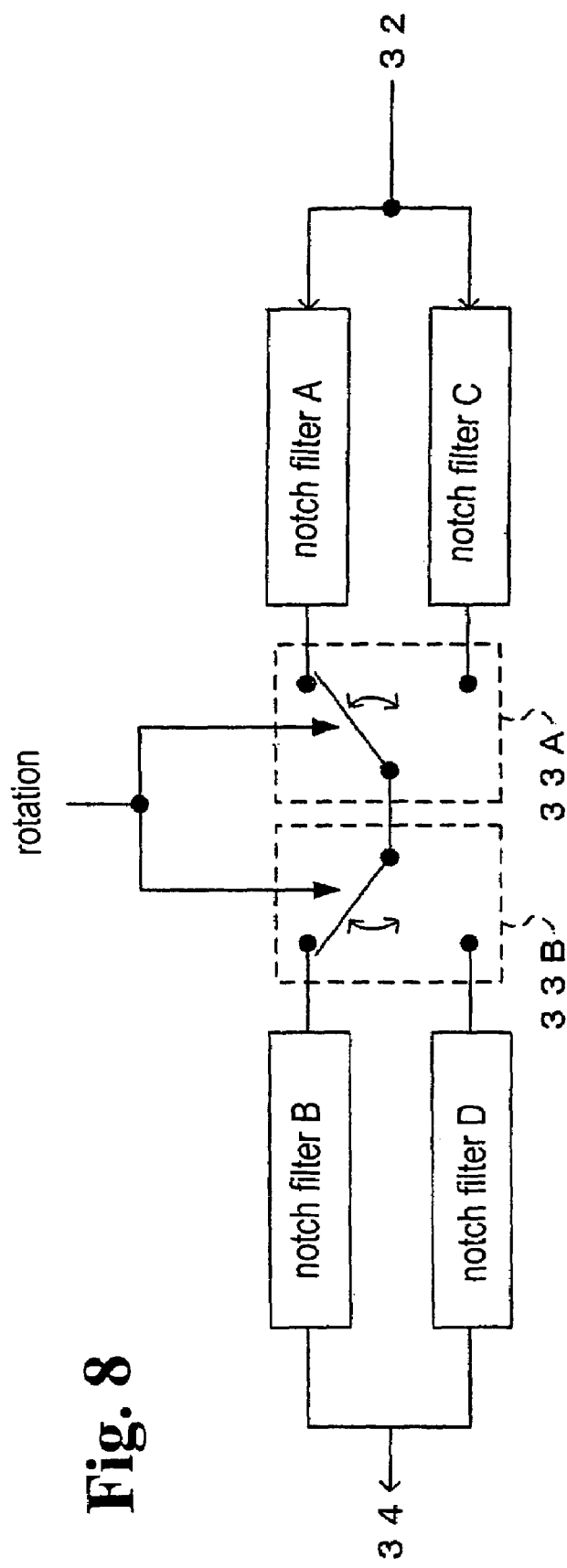
FIG. 8 is a block diagram showing a modified example of a filter unit.

When the characteristic frequency by the rotational speed is greatly changed, the number of the notch filters may be increased and switched. For example, as shown in FIG. 8, four notch filters A to D and filter switching portions 33A and 33B may be provided, and the combination may be switched in three levels such as "A+B", "B+C", and "C+D" by switching the filter switching portions 33A and 33B according to the rotational speed. In addition, the center frequencies $f_A$, $f_B$, $f_C$, and $f_D$ of each notch filter A to D are set so that $f_A<f_B<f_C<f_D$ is established. When the digital filter processing is carried out, for example using DSP (Digital Signal Processing), it is necessary to constantly calculate just two notch filters. As a result, even if the number of the notch filters is increased, a calculation load does not change.

In the above embodiment, when the first filter is switched to the second filter, the switching is carried out in such a way that a high-frequency side of the notch filter of the first filter and a low-frequency side of the notch filter of the second filter are common, i.e., the notch filter B. When the difference of the pumps among the devices is small, the high-frequency side of the notch filter of the first filter and the low-frequency side of the notch filter of the second filter do not have to be common. For example, the notch filter D may be provided on the high-frequency side, and the first filter may be "A+B", and the second filter may be "C+D". In this case, upon switching, the notch filters C and B have the non-passing bands in which the characteristic frequencies are partially overlapped. When the difference of the pumps among the devices is small and one notch filter can cover, the notch filter B in FIG. 3 may be omitted, and the notch filters A and C may be the first and second filters, respectively.

Figure 9A:
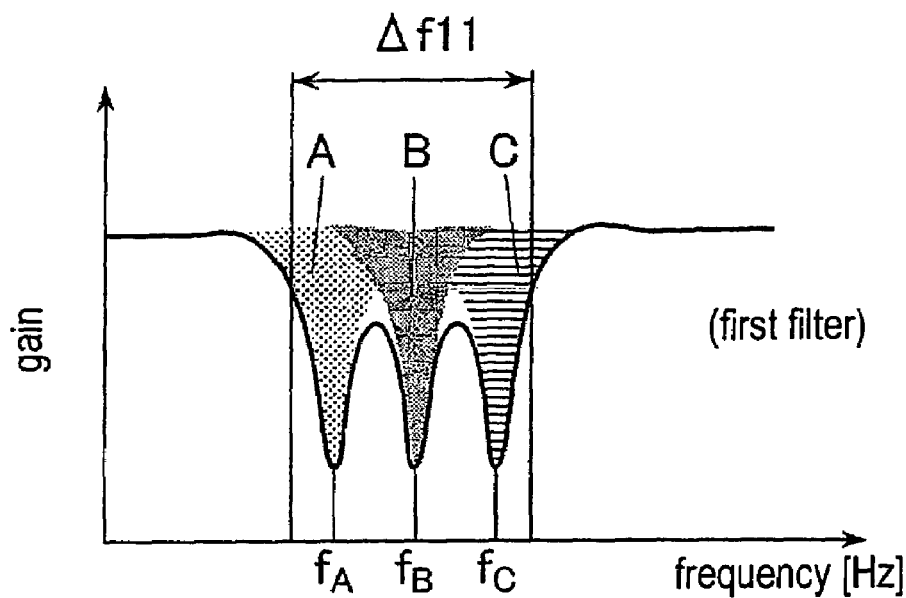
FIGS. 9(a) and 9(b) are charts showing a first modified example of the switching operation of the filters.
Figure 9B:
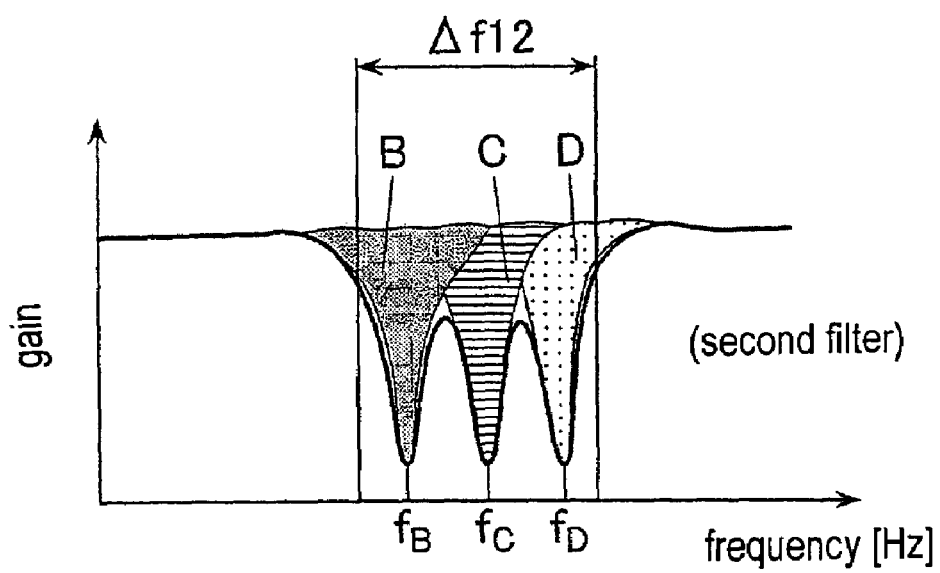

When the difference of the pumps among the devices is large, as shown in FIGS. 9(a) and 9(b), the four notch filters A to D are used to form the first filter and the second filter wherein the three notch filters are combined together. The first filter shown in FIG. 9(a) is a filter wherein the notch filters A, B, and C are connected in series. A non-passing band Δf11 is widened more than the non-passing band Δf1 shown in FIG. 7(a). The notch filter D is connected to the high-frequency side in place of the notch filter A shown in FIG. 9(a) to form the second filter as shown in FIG. 9(b). The center frequency of the notch filter D is the $f_D$, and a non-passing band Δf12 is extended to the higher-frequency side further than the Δf2 in FIG. 7(b).

Figure 10A:
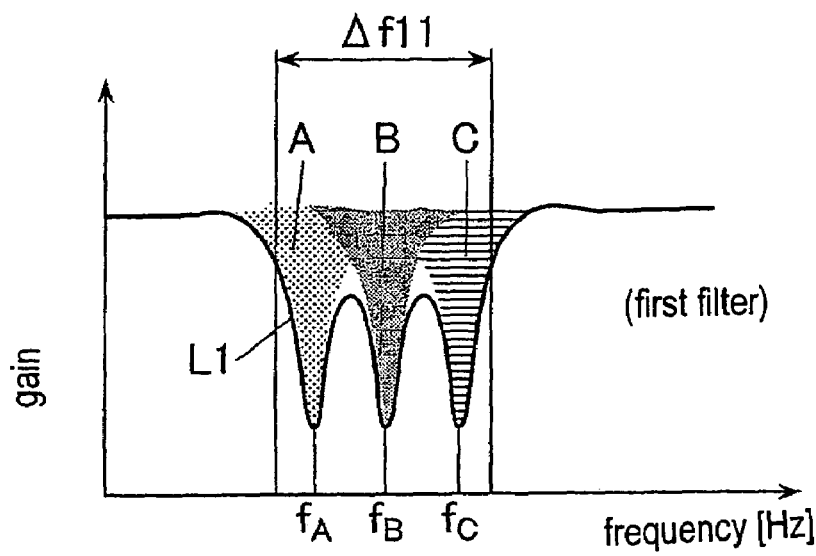
FIGS. 10(a) and 10(b) are charts showing a second modified example of the switching operation of the filter.
Figure 10B:
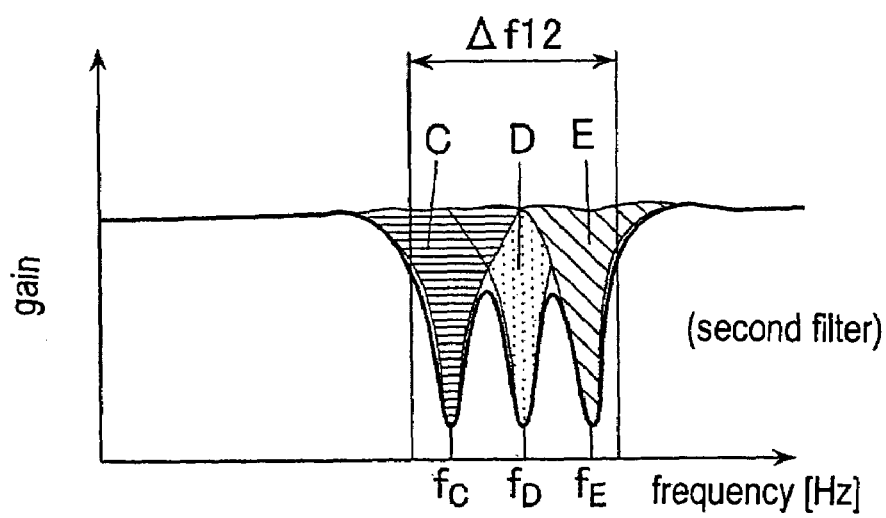

In examples shown in FIGS. 9(a) and 9(b), one of the notch filters is switched and becomes the first filter and the second filter. As shown in FIGS. 10(a) and 10(b), two of the notch filters may be switched. In this case, five notch filters A to E may be provided. In the second filter, the notch filter C is left, and the notch filters D and E are connected to the high-frequency side in place of the notch filters A and B.

Figure 11:
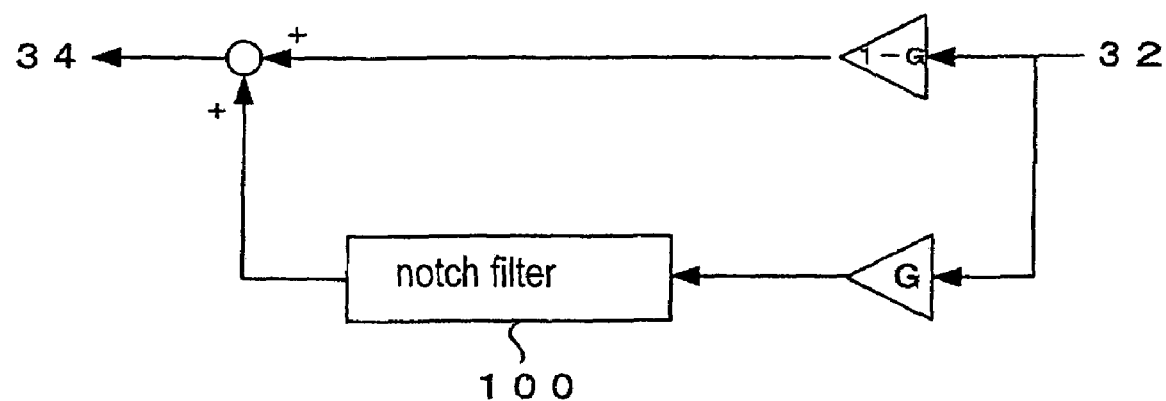
FIG. 11 is a diagram showing a modified example of the configuration of the filter unit.

In the example shown in FIG. 3, the filter unit (notch filter) conventionally provided between the PID control unit 32 and the exciting amp 34 is replaced by the notch filters A, B, and C and the filter switching portion 33. When the filter unit has the configuration shown in FIG. 11, the present invention can be applied. As shown in FIG. 3, the notch filters A, B, and C and the filter switching portion 33 may be used in place of a notch filter 100, or a configuration shown in FIG. 8 may be used.

In the embodiments, the turbo-molecular pump is explained as an example. The present invention can be applied not only to the turbo-molecular pump, but also to a magnetic bearing device with a characteristic vibration of an axial axis of a rotating member shown in FIG. 5. The invention is not limited to the above-mentioned embodiments.

In the above-mentioned embodiments, the PID control unit 32 constitutes a control unit, and the filter switching portions 33, 33A, and 33B constitute a selection device and a forming device, respectively.

The disclosure of Japanese Patent Application No. 2004-146775, filed on May 17, 2004, is incorporated in the application.

While the invention has been explained with reference to the specific embodiments of the invention, ht explanation is illustrative and the invention is limited only by the appended claims.

What is claimed is:

1. A magnetic bearing control device for a rotating member supported on an axial magnetic bearing and a radial magnetic bearing without contact, comprising:
   a rotation speed sensor for detecting a rotational speed of the rotating member,
   a displacement sensor for detecting an axial displacement of the rotating member,
   a filter unit for reducing a signal with a specific frequency band from a signal transferred from the displacement sensor and passing a remaining signal, said filter unit having a plurality of notch filters with different specific frequency bands, and a selection device for selecting at least one of the notch filters according to the rotational speed detected by the rotation speed sensor and inputting the signal transferred from the displacement sensor to the at least one of the notch filters selected by the selection device,
   a control unit for outputting a control signal of the axial magnetic bearing, said control unit being disposed before or after the filter unit, and
   a driving unit for driving the axial magnetic bearing based on the filtered output from the filter unit,
   wherein said selecting device selects more than two notch filters from the plurality of notch filters according to the rotational speed detected by the rotation speed sensor, and connects the more than two notch filters in series to thereby operate as a forming device for forming a group of notch filters, said control signal being input to the more than two notch filters formed by forming device or prepared by signals passing through the notch filters.

2. A magnetic bearing control device according to claim 1, wherein said forming device selects the more than two notch filters in changing the notch filters such that at least one of the more than two notch filters is same before and after the rotational speed detected by the rotational speed sensor is changed.

3. A magnetic bearing control device according to claim 1, wherein said forming device selects the more than two notch filters having different center frequencies of the specific frequency bands so that the center frequencies are located adjacent to each other and specific frequency bands are partially overlapped.

4. A magnetic bearing control device according to claim 2, wherein said forming device selects the more than two notch filters having different center frequencies of the specific frequency bands so that the center frequencies are located adjacent to each other and specific frequency bands are partially overlapped.

5. A magnetic bearing control device for a rotating member supported on an axial magnetic bearing and a radial magnetic bearing without contact, comprising:
   a rotation speed sensor for detecting a rotational speed of the rotating member,
   a displacement sensor for detecting an axial displacement of the rotating member,
   a filter unit for reducing a signal with a specific frequency band from a signal transferred from the displacement sensor and passing a remaining signal, said filter unit having a plurality of notch filters with different specific frequency bands, and a selection device for selecting at least one of the notch filters according to the rotational speed detected by the rotation speed sensor and inputting the signal transferred from the displacement sensor to the at least one of the notch filters selected by the selection device,
   a control unit for outputting a control signal of the axial magnetic bearing, said control unit being disposed before or after the filter unit, and
   a driving unit for driving the axial magnetic bearing based on the filtered output from the filter unit,
   wherein said plurality of notch filters includes the specific frequency bands different from and partially overlapping with each other.

6. A magnetic bearing control device according to claim 1, wherein said control unit is disposed between the displacement sensor and the filter unit or between the filter unit and the driving unit.

* * * * *